March 11, 1930.  L. N. McCLELLAN ET AL  1,750,417
PRESSURE ACTUATED CONTROL VALVE
Filed Jan. 31, 1928
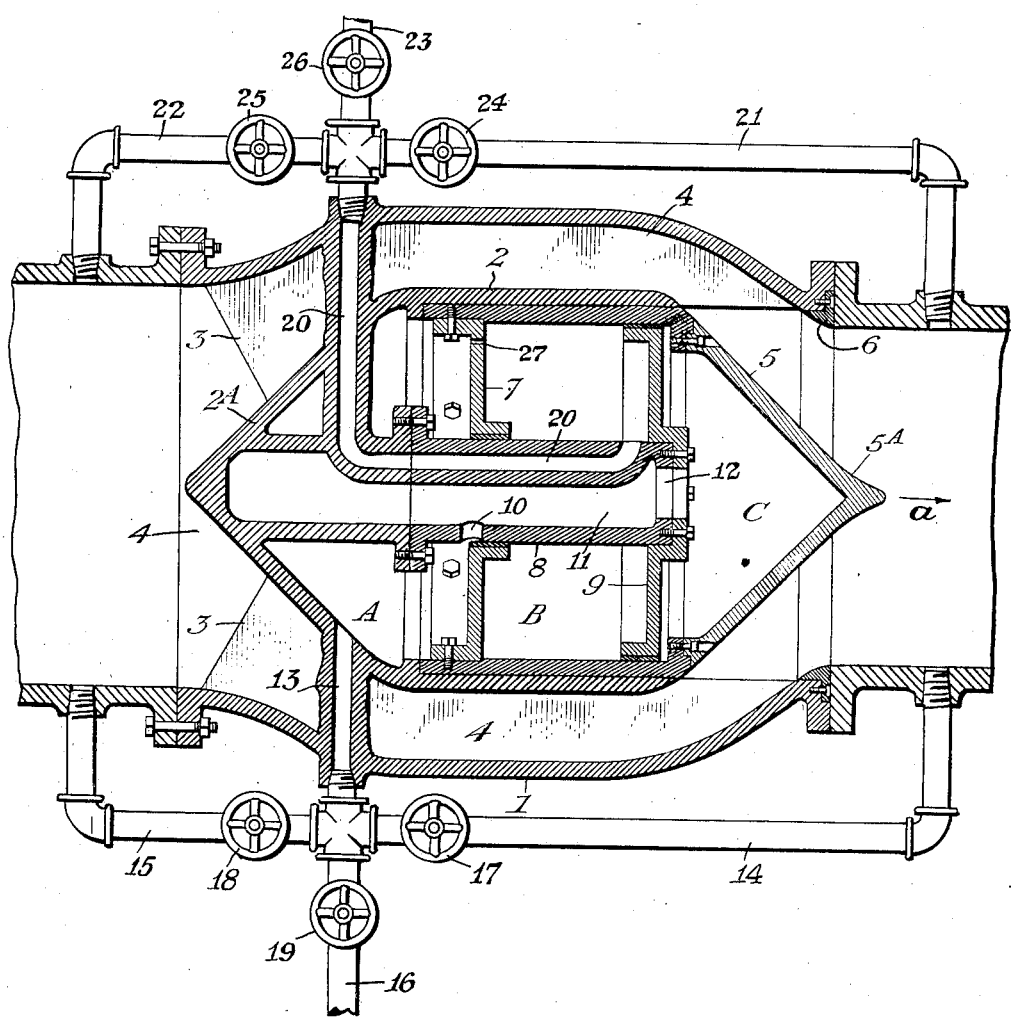
Inventors:
Leslie N. McClellan
Phillip A. Kinzie
John L. Savage
Charles M. Day
By H S Bailey Attorney Patented Mar. 11, 1930

1,750,417

UNITED STATES PATENT OFFICE

LESLIE N. McCLELLAN, PHILLIP A. KINZIE, JOHN L. SAVAGE, AND CHARLES M. DAY, OF DENVER, COLORADO

PRESSURE-ACTUATED CONTROL VALVE

Application filed January 31, 1928. Serial No. 250,778.

Our invention relates to a pressure actuated control valve, and the objects of our invention are:

First, to provide a valve having an annular waterway between a cylindrical outer body and a smaller concentric inner body with conical ends; the concentric inner body being formed by a hollow movable needle which telescopes into and interlocks with a hollow fixed cylinder, in such manner that the closed inner end of the movable needle forms a movable piston within the fixed cylinder, and the closed end of the fixed cylinder forms a fixed diaphragm within the movable needle, the movable piston and fixed diaphragm thus dividing the hollow inner body into three tandem pressure chambers, wherein, one chamber lies within the fixed cylinder between its conical end and the movable piston, the next chamber lies within the overlapping portions of the fixed cylinder and the movable needle between the movable piston and the fixed diaphragm, and the third chamber lies within the movable needle between the fixed diaphragm and the conical end of the movable needle.

Second, to provide a type of valve commonly known to those skilled in the art as a needle valve, by means of which the flow of water or other liquid in a conduit or pipe line is regulated, and wherein the moving element or needle of the valve is actuated by the pressure of the water in the said conduit. Such a needle valve might, for example, be used in a city water main, or in a penstock leading to a hydraulic turbine, or at the end of an outlet conduit through a dam, in each case, for stopping or controlling the flow through the conduit. The specific applications mentioned above are for the purpose of illustration and there are of course, many other applications.

We attain these objects by the mechanism illustrated in the accompanying drawing in which the figure is a vertical sectional elevation taken substantially upon the longitudinal center line of the valve and the portions of a conduit connected to the ends thereof.

The valve consists of a cylindrical outer casing or valve body 1, in which a smaller concentric fixed cylinder or valve element 2 is connected thereto by radial ribs 3, thus forming an annular waterway 4 between the valve body 1 and the fixed cylinder 2. A movable plunger or needle 5 telescopes into the fixed cylinder 2 when the valve is opened and moves in the opposite direction to closure at seat 6 in the throat of the valve body 1 when the valve is closed. The outer end of the movable needle 5 is closed by a conical head 5A, and the inner telescoping end is closed by an annular movable piston 7. The fixed cylinder 2 is closed at the outer end by a conical head 2A and at the other end by a fixed diaphragm 9, which is supported by an axial concentric cylindrical tube 8, attached to the conical end of fixed cylinder 2. The fixed diaphragm 9 is positioned inside the movable needle 5, and has its outer periphery in sliding contact with the inside thereof.

The hollow enclosure formed by the fixed cylinder 2 and the telescoping needle 5 is thus divided, by the annular piston 7 and the fixed diaphragm 9, into three separate tandem pressure chambers A, B, and C. Chamber A is connected with chamber C by suitable communicating passages, as shown at 10, 11 and 12, in such manner that water can readily pass from chamber A to chamber C or vice versa whenever the movable needle opens and closes in the normal operation of the valve, and pressure in these two chambers is thereby equalized at all times. The pressure in chambers A and C may be reduced to atmospheric pressure or to a point of lower pressure in the conduit, by a passageway 13 of liberal area connected with pipes 14 and 15 leading to the upstream and downstream sides of the valve, respectively, and with a pipe 16 furnishing an exhaust. These pipes are provided with any suitable means for automatic or hand control, such as valves 17, 18 and 19, respectively. Chamber B may be connected to the pipe line or conduit by a passageway 20 of liberal area permitting flow in either direction between the conduit and chamber B through pipes 21 and 22 leading to the upstream and downstream sides of the valve, respectively. The pressure in chamber B may also be reduced to atmosphere or to a point of lower pressure through a pipe 23, and the pipes 21, 22 and 23 are provided with suitable means for automatic or manual control such as valves 24, 25 and 26, respectively.

With pressure conditions thus established within the valve it is obvious that the movable needle is subject to the following operative forces:

*Closing forces.*—(*a*) Conduit pressure within chamber A acting against the face an annular piston 7, with or without chamber B reduced to lower or atmospheric pressure. (*b*) Conduit pressure within chamber C acting against the conical end of movable needle 5, with or without chamber B reduced to lower or atmospheric pressure.

*Opening forces.*—(*c*) Conduit pressure within chamber B acting against the face of annular piston 7, with chambers A and C reduced to lower or atmospheric pressure. (*d*) Conduit pressure acting against part or all of the outside of the conical end of movable needle 5, depending on whether the needle is closed against seat 6, or whether it is partly or wholly open, it being understood that the valve is normally so arranged that the flow is in the direction of the arrow *a*, although its position may be, and in some installations is, reversed.

With these forces available it is possible to force the needle open or closed or to hold it in any intermediate position by suitably regulating the pressure in chambers A and C and in chamber B. For example, when the pressure is reduced in chamber B, and pressure is allowed to accumulate in chambers A and C, the movable needle will be forced to close against seat 6, whereas when the pressure is permitted to accumulate in chamber B and is reduced in chambers A and C the movable needle will be forced open. Likewise when the closing forces are equalized with the opening forces by suitable control of the pressure in chambers A and C, and in chamber B at any intermediate position of the movable needle, the valve can be held at partial opening for throttle service. In the normal operation of the valve when installed at the end of a conduit, chamber B is maintained under full conduit pressure at all times, and control is had through regulation of the pressure in chambers A and C. Chamber B in this case supplies pressure very slowly to chambers A and C by restricted leakage past annular piston 7 and fixed diaphragm 9, which leakage may be supplemented if desired by means of a small port 27 in piston 7, or a similar port (not shown) in diaphragm 9. However, when the valve is installed in a pipe line or penstock it is obvious that the pressure in chamber B can likewise be increased or decreased as required to secure the proper actuating forces.

The differential between the opening and closing forces in the needle valve of this invention is much greater than in other valves with which we are familiar due to the large additional actuating pressure areas provided by the annular piston 7 and the conical end of the movable needle. These increased differential pressure areas constitute one of the important features of our valve because they insure greater forces to overcome friction in the movable needle and to operate the valve under low conduit pressures. The friction of the movable needle is often increased materially where such a valve is installed in water that has a corrosive action on the metal parts, and it is well known that other valves have failed to function under such conditions because the differential forces were insufficient to overcome this excessive friction.

The movable needle 5 is prevented from slamming in the wide open position and at closure by means of suitable restrictions in the communicating water passage or passages between chambers A and C, and between chamber B and the pipe line or conduit, the movable piston functioning to establish said restrictions by gradually closing the passage 10 and the end of passage 20 as the moving needle approaches the limits of its travel. In addition to this dampening effect at either limit of travel of the movable needle, through restriction of the water passages, the valve is inherently dampened against too rapid travel of the movable needle by the action of the annular piston 7 between the opposing pressure chambers A and B. This is particularly true in our valve because the piston itself is not perforated with communicating ports, other than the very small port 27, as is the case with other commercial valves utilizing such a piston for dash pot or dampening effect. The water displaced from chambers A and C is forced through the restricted leakage spaces to chamber B or through passage 13 to exhaust or to the conduit, while the water displaced from chamber B is forced back into the pipeline or conduit through the communicating passage connecting thereto.

The needle valve of this invention when compared with other valves of this general type with which we are familiar, is very considerably reduced in length and diameter, and consequently in weight and cost, on account of the arrangement of the differential pressure chambers. In the other valves mentioned it has been the practice to provide an external differential piston or a differential shoulder compensating for the difference between the cross-sectional area of the movable needle and the cross-sectional area at the valve seat. In our valve the differential area is provided by the internal annular piston and the hereinbefore described arrangement of pressure chambers. By this arrangement we reduce the diameters of the valve body 1, the fixed cylinder 2 and the movable needle 5 as compared with the diameters of the corresponding parts of other valves by approximately the difference between the diameters of the external differential piston and the movable needle, plus the difference, if any, between the diameter of the movable needle and the diameter at the valve seat. This reduction in diameter also effects a corresponding reduction in the length of the valve by reason of the smaller horizontal projection of the sloping portions of the annular waterway. For example, a 60-inch needle valve of the external differential type designed in July, 1923, by the Bureau of Reclamation has an overall length from flange to flange of 158″, and a diameter at outside of valve body of 116″ and a total weight of about 85,000 pounds. A valve of our design, having the same hydraulic capacity, has an overall length from flange to flange of 111½″, a diameter at outside of valve body of 103½″, and a total estimated weight of 55.000 pounds. These comparative figures are given to illustrate the economic importance of our design of needle valve and to show that this invention embodies our improvements and economies in valves of this type.

It will be obvious to those skilled in the art to which the invention relates that modifications may be made in the details of construction of the parts and their relative arrangement without departing from the spirit of our invention or the scope of the following claims.

What we claim is:—

1. In a valve of the character described, the combination with a valve body and a fixed valve element therein, of a movable plunger carried by said valve element and provided with means forming a movable piston cooperating with the valve element, said element provided with a diaphragm cooperating with the movable plunger, said valve member, plunger, piston and diaphragm so associated as to form a plurality of separate pressure chambers, means for introducing pressure fluid into said chambers, means affording communication between all of said chambers, means affording free transference of pressure fluid between certain of said chambers whereby the pressures therein are equalized, means for supplying pressure fluid to a chamber intermediate said certain chambers, and controlling means for said pressure fluid supplying means.

2. In a valve of the character described, the combination with a valve body and a fixed valve element therein, of a movable plunger carried by said valve element and provided with means forming a movable piston cooperating with the valve element, said element provided with a diaphragm cooperating with the movable plunger, said valve member, plunger, piston and diaphragm so associated as to form three separate pressure chambers comprising a central chamber and two end chambers in tandem alignment, means for introducing pressure fluid into said chambers, means affording communication between the central chamber and the two end chambers, means affording communication between the two end chambers, means for controlling the admission to and escape of pressure fluid from the central chamber, and means for controlling the admission to and escape of the pressure fluid from the two end chambers.

3. A device of the character described, having a valve body, a valve element within said body and fixed relatively thereto a plunger arranged in telescoping relation to said element, a fixed diaphragm carried by said element and contained within the plunger, a piston carried by said plunger, said valve element, plunger, piston and diaphragm forming three chambers in axial tandem alignment whose cubical contents vary as movement of the plunger varies, said chambers comprising a central chamber and two end chambers, and being so intercommunicating that the fluid pressure in each chamber may equal that of the other chambers, means for introducing fluid under pressure into both of the end chambers, means for simultaneously permitting the pressure fluid to escape from the central chamber, this control of pressures in the chambers causing the needle to close against pipe line pressure, and means for reversing the pressures thus established to cause the needle to move in the opening direction.

4. A water receiving and controlling valve, including a valve body adapted to be connected to a water conveying conduit and provided with a valve seat, an axially positioned valve element fixed within said body, a movable plunger telescopically arranged relatively to said element and provided with a seating surface arranged to register with the valve seat of said body when the valve is closed, said valve element provided with an axial tubular member carrying a fixed diaphragm, a piston carried by and movable with said plunger and in sliding contact with said axial tubular member, said valve element, plunger, piston and diaphragm forming three chambers adapted to receive a pressure fluid, and said tubular member affording communication between two of said chambers.

5. A fluid receiving and controlling valve, including a valve body arranged to be connected to a fluid conveying conduit, said valve being arranged to receive flowing fluid at one end and to control its discharge from the opposite end, a valve seat arranged in said body, a movable plunger adapted for cooperation with said seat, a fixed valve element within said body and having a conical head at one end and adapted to telescopically receive said movable plunger at its opposite end, said valve element providing an annular waterway within said body, a piston movable with said plunger, a fixed tubular member within said valve element, a fixed diaphragm carried by the end of said tubular member and arranged to fit within said plunger, said valve member, plunger, piston and diaphragm providing three tandem pressure chambers adapted to receive pressure fluid from said conduit, and means for controlling the relative pressures in all of said chambers.

6. In a valve of the character described, a hollow body, a hollow fixed valve member supported within the body and spaced therefrom to form an annular waterway, said fixed valve member having a conical outer end, an axial tube extending from the conical end of the fixed member to the opposite end thereof, a hollow plunger mounted in the fixed member having a piston at its inner end through which said tube passes, and a diaphragm on the end of said tube fitting within said plunger, said plunger having a conical outer end, said diaphragm and piston enclosing a central pressure chamber, an end pressure chamber defined by the fixed diaphragm and the conical end of the plunger, an end pressure chamber defined by the piston and the conical end of the fixed member, movement of said plunger acting to vary the volume of the central pressure chamber relatively to that of the end pressure chambers, means affording free communication between said end chambers, and a valve seat formed in the body with which said plunger cooperates and limits the closing movement of said plunger.

7. In a valve of the character described, a hollow body, a valve seat therein, a hollow fixed valve member supported within the body and spaced therefrom to form an annular waterway therethrough, the fixed member having a conical outer end, an axial tube extending from the conical end of the fixed member to the opposite end thereof, a hollow movable plunger mounted in the fixed member, a piston movable with and forming the inner end of the movable plunger and through which the tube passes, a fixed diaphragm on the end of the tube and fitting within the movable plunger, the movable plunger having a conical outer end adapted for seating contact with said seat to close the valve, the movable piston and the fixed diaphragm defining a central pressure chamber, the fixed diaphragm and the conical end of the movable plunger enclosing an end pressure chamber, the movable piston and the conical end of the fixed member enclosing another end chamber, said chambers adapted to receive a pressure fluid, the closing movement of the movable plunger decreasing the volume of the central pressure chamber and increasing the volumes of the two end pressure chambers, a pressure equalizing passage defined by said tube between the two end chambers whereby the unit pressures in these two chambers are equalized at all times, means for communicating the fluid pressure from the central chamber to the two end chambers, means for controlling the pressure fluid supplied to the two end chambers, and means for controlling the pressure fluid supplied to the central chamber.

8. In a valve of the character described, a hollow body, a hollow fixed valve member supported within the body and spaced therefrom to form an annular waterway therethrough, the fixed member having a conical outer end, an axial tube extending from the conical end of the fixed member to the opposite end thereof, a hollow movable plunger mounted in the fixed member, a movable piston forming the inner end of the movable plunger and through which the tube passes, a fixed diaphragm on the end of said tube and fitting within the movable plunger, the movable plunger having a conical outer end, the movable piston and the fixed diaphragm defining a central pressure chamber, the fixed diaphragm and the conical end of the movable plunger enclosing an end pressure chamber, the movable piston and the conical end of the fixed member enclosing another end pressure chamber, all of said chambers adapted to receive a pressure fluid, the closing movement of the movable plunger decreasing the volume of the central pressure chamber and increasing the volumes of the two end pressure chambers, a seat in the body defining the closing movement of the movable plunger, means defined by said tube for affording communication between the two end chambers whereby the unit pressures in these two chambers are equalized at all times, means for communicating the fluid pressure from the central chamber to the two end chambers, means that will prevent or allow the escape of the pressure fluid from the two end chambers, means for supplying pressure fluid to the central chamber, and means that will prevent or allow the escape of the pressure fluid from the central chamber, the pressure fluid in said chambers being thereby controllable to act on the outside of said movable piston and on the inside of the conical end of the movable plunger to close the valve and on the inside of said movable piston and on the outside of the conical end of the movable plunger to open the valve.

9. In a valve of the character described, a hollow body, a hollow fixed valve member supported within the body and spaced therefrom to form an annular waterway therethrough, the fixed member having a conical outer end, an axial tube extending from the conical end of the fixed member to the opposite end thereof, a hollow movable plunger mounted in the fixed member, a movable piston forming the inner end of the movable plunger and through which said tube passes, a fixed diaphragm on the end of said tube and fitting within the movable plunger, the movable plunger having a conical outer end, the movable piston and the fixed diaphragm defining a central pressure chamber, the fixed diaphragm and the conical end of the movable plunger enclosing an end pressure chamber, the movable piston and the conical end of the fixed member enclosing another end pressure chamer, said chambers adapted to receive a pressure fluid, the closing movement of the movable plunger decreasing the volume of the central pressure chamber and increasing the volumes of the two end pressure chambers, the movable piston and the conical end of the movable plunger forming two separate pressure areas against which the pressure fluid acts alternately on opposite sides to open and close the valve, a seat in the body defining the closing movement of the movable plunger, a pressure equalizing passage defined by said tube between the two end chambers whereby the unit pressures in these two chambers are equalized at all times, means for communicating the fluid pressure from the central chamber to the two end chambers, means that will prevent or allow the escape of the pressure fluid from the two end chambers, means for supplying pressure to the central chamber, and means that will prevent or allow the escape of the pressure fluid from the central chamber.

10. A pressure actuated control valve, having a valve body, a fixed valve element arranged therein and providing a fluid flow passageway therethrough, a flow control plunger carried by said fixed element and slidable relatively thereto and to said body for controlling the flow of fluid through said passageway, a fixed diaphragm carried by said fixed element and a piston carried by said control plunger and providing a plurality of pressure chambers within said fixed element and plunger, a tube carried by said fixed element and passing through said piston and providing a passage affording communication between two of said chambers whereby a transference of fluid between said chambers may be effected upon movement of said control plunger, said piston cooperating with said passage adjacent to the limit of its travel with said plunger to dampen movement of said plunger.

11. A pressure actuated control valve, having a valve body, a fixed valve element arranged therein and providing a fluid flow passageway therethrough, a flow control plunger carried by said fixed element and slidable relatively thereto and to said body for controlling the flow of fluid through said passageway, a fixed diaphragm carried by said fixed element and a piston carried by said control plunger and providing a plurality of pressure chambers within said fixed element and plunger, a tube carried by said fixed element and passing through said piston and providing a passage affording communication between two of said chambers whereby a transference of fluid between said chambers may be effected upon movement of said control plunger, and a passage for supplying fluid to the other of said chambers, said piston cooperating with said passages adjacent to the limits of its travel with said plunger to dampen movement of said plunger adjacent to the limits of its travel.

12. In a valve of the character described, a valve body adapted to be arranged in a fluid conduit and provided with a seat, a fixed valve element carried by said body and defining a fluid flow passageway therethrough, a plunger carried by said fixed element and slidable relatively thereto and provided with a head for cooperation with said seat to control said passageway, a fixed diaphragm carried by the fixed element, a piston carried by the plunger and movable therewith, said diaphragm and piston dividing the space within said fixed element and plunger into three separate pressure chambers comprising a central chamber and adjacent end chambers, means affording communication between said end chambers whereby the pressures therein are balanced, connections between said central chamber and the conduit at both sides of the valve, connections between said end chambers and the conduit at both sides of the valve, and means in said connections for controlling the admission to and discharge of pressure fluid from said chambers, whereby the position of said plunger head relatively to said seat may be regulated at will in response to variation and balance of pressures in said central chamber and said end chambers, respectively.

In testimony whereof, we affix our signatures.

LESLIE N. McCLELLAN.
PHILLIP A. KINZIE.
JOHN L. SAVAGE.
CHARLES M. DAY.

DISCLAIMER 1,750,417.—*Leslie N. McClellan, Phillip A. Kinzie, John L. Savage,* and *Charles M. Day,* Denver, Colo. PRESSURE-ACTUATED CONTROL VALVE. Patent dated March 11, 1930. Disclaimer filed May 25, 1931, by the assignee, *Universal Hydraulic Corporation.*

Hereby enters this disclaimer to the subject matter comprising claim 5, which claim 5 reads as follows:

"5. A fluid receiving and controlling valve, including a valve body arranged to be connected to a fluid conveying conduit, said valve being arranged to receive flowing fluid at one end and to control its discharge from the opposite end, a valve seat arranged in said body, a movable plunger adapted for cooperation with said seat, a fixed valve element within said body and having a conical head at one end and adapted to telescopically receive said movable plunger at its opposite end, said valve element providing an annular waterway within said body, a piston movable with said plunger, a fixed tubular member within said valve element, a fixed diaphragm carried by the end of said tubular member and arranged to fit within said plunger, said valve member, plunger, piston and diaphragm providing three tandem pressure chambers adapted to receive pressure fluid from said conduit, and means for controlling the relative pressures in all of said chambers."

[*Official Gazette June 23, 1931.*]